United States Patent
Seifert et al.

(10) Patent No.: US 9,188,439 B2
(45) Date of Patent: Nov. 17, 2015

(54) METHOD AND DEVICE FOR DETERMINING DISTANCES ON A VEHICLE

(75) Inventors: Wolfgang Seifert, Wielenbach (DE); Steffen Abraham, Hildesheim (DE); Axel Wendt, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 625 days.

(21) Appl. No.: 13/580,688

(22) PCT Filed: Jan. 4, 2011

(86) PCT No.: PCT/EP2011/050045
§ 371 (c)(1),
(2), (4) Date: Nov. 5, 2012

(87) PCT Pub. No.: WO2011/104041
PCT Pub. Date: Sep. 1, 2011

(65) Prior Publication Data
US 2013/0188020 A1      Jul. 25, 2013

(30) Foreign Application Priority Data
Feb. 23, 2010 (DE) .......... 10 2010 002 258

(51) Int. Cl.
*G01C 11/02*     (2006.01)
*G01B 11/275*   (2006.01)

(52) U.S. Cl.
CPC .......... *G01C 11/025* (2013.01); *G01B 11/2755* (2013.01); *G01B 2210/286* (2013.01)

(58) Field of Classification Search
None
See application file for complete search history.

(56) References Cited

U.S. PATENT DOCUMENTS

| 6,260,860 | B1 * | 7/2001 | Brookes et al. | ............ 280/6.157 |
| 2005/0030525 | A1 | 2/2005 | Forster et al. | |
| 2006/0274302 | A1 * | 12/2006 | Shylanski et al. | ....... 356/139.09 |
| 2007/0124949 | A1 | 6/2007 | Burns, Jr. et al. | |

FOREIGN PATENT DOCUMENTS

| CN | 1826508 A | 8/2006 |
| CN | 101160505 A | 4/2008 |
| CN | 102159918 A | 8/2011 |
| DE | 10 2004 013 441 A1 | 10/2005 |

(Continued)

OTHER PUBLICATIONS

International Search Report corresponding to PCT Application No. PCT/EP2011/050045, mailed Apr. 4, 2011 (German and English language document) (7 pages).

*Primary Examiner* — Kate Luo

(74) *Attorney, Agent, or Firm* — Maginot, Moore & Beck LLP

(57) ABSTRACT

A method for determining distances for chassis measurement of a vehicle having a body and at least one wheel includes determining a center of rotation of a wheel of the vehicle by projecting a structured light pattern at least onto the wheel, recording a light pattern reflected by the wheel using a calibrated imaging sensor system, determining a 3D point cloud from the reflected light pattern, and determining the center of rotation of the wheel from the 3D point cloud. The method also includes determining a point on the body by evaluating the previously determined 3D point cloud or by evaluating a plurality of grey-scale images recorded under unstructured illumination. A height level is determined as a vertical distance between the center of rotation of the wheel and the point on the body.

7 Claims, 7 Drawing Sheets

(56) References Cited

FOREIGN PATENT DOCUMENTS

| DE | 10 2006 048 726 A1 | 4/2008 |
| DE | 10 2007 021 328 A1 | 11/2008 |
| DE | 10 2008 042 145 A1 | 3/2010 |
| EP | 1 505 367 A2 | 2/2005 |
| WO | 2008/028832 A1 | 3/2008 |
| WO | 2008/046714 A2 | 4/2008 |
| WO | 2008/046715 A1 | 4/2008 |

* cited by examiner

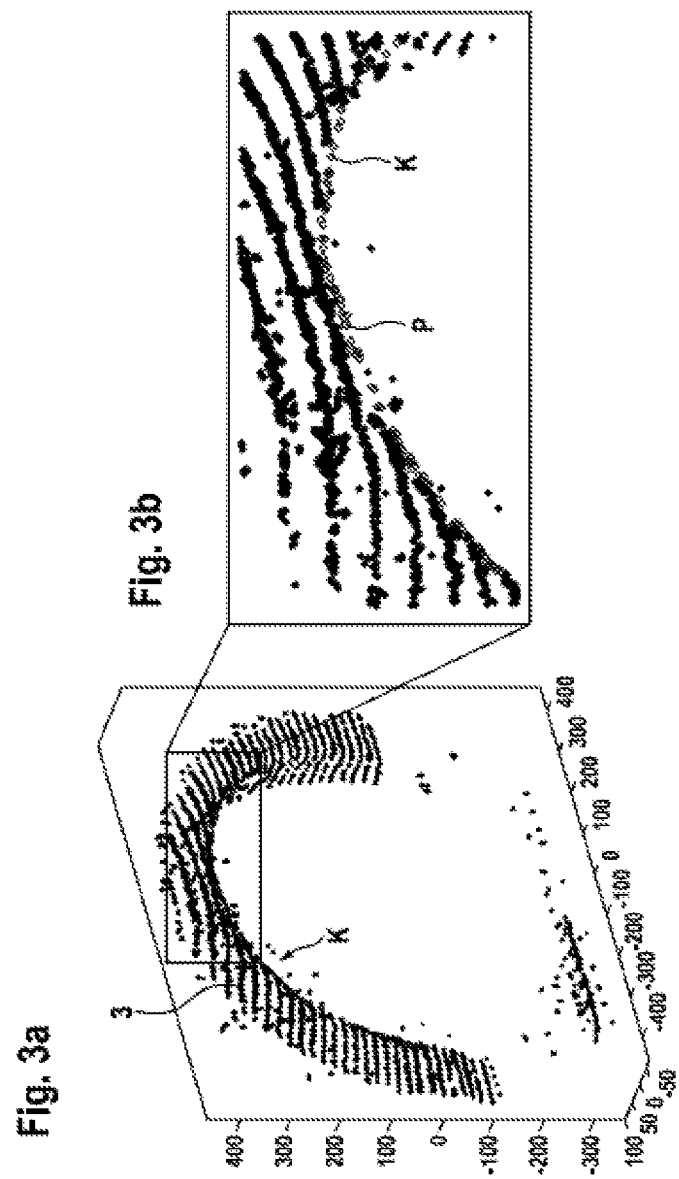

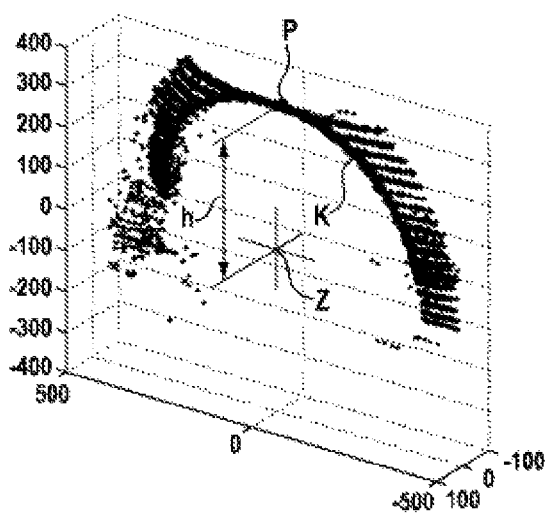
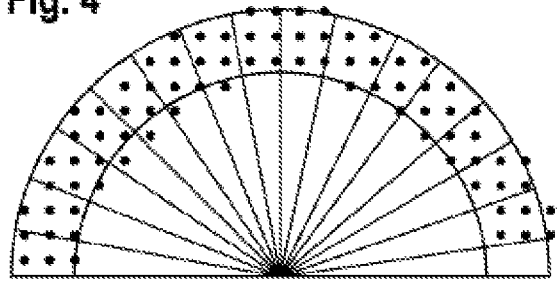
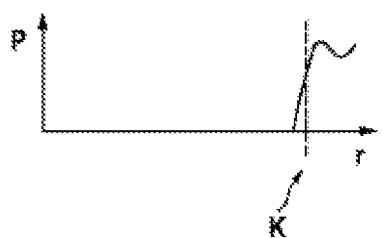

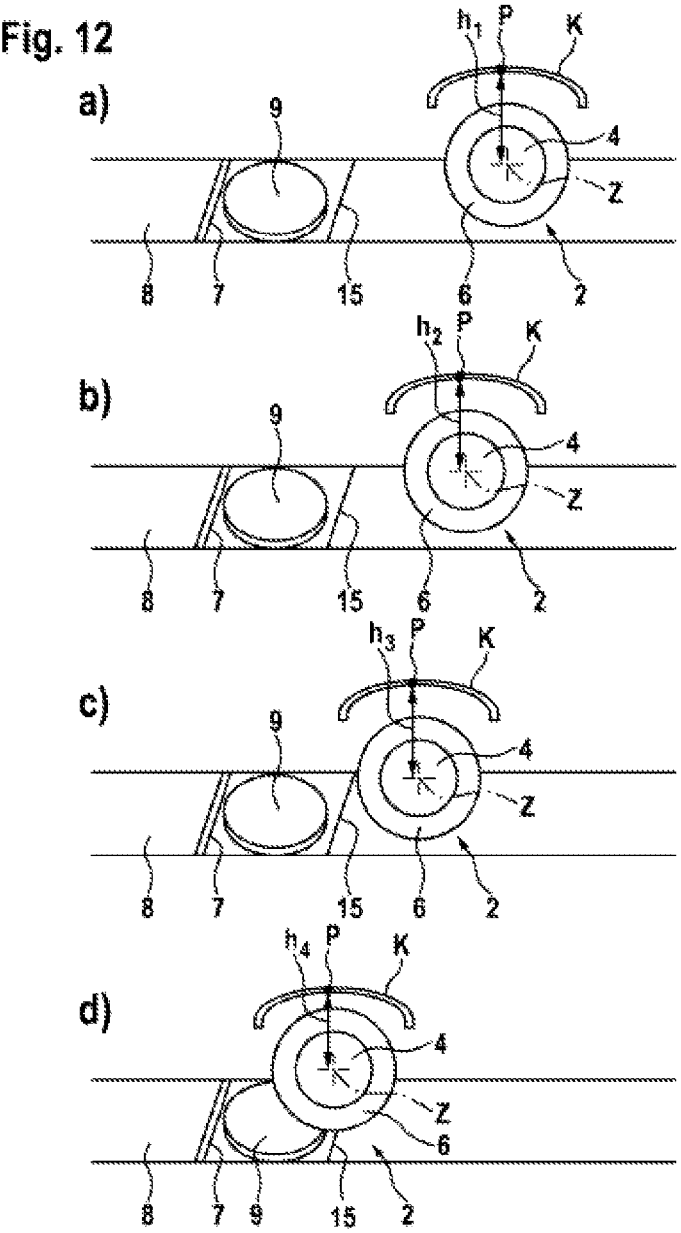

METHOD AND DEVICE FOR DETERMINING DISTANCES ON A VEHICLE

This application is a 35 U.S.C. §371 National Stage Application of PCT/EP2011/050045, filed on Jan. 4, 2011, which claims the benefit of priority to Serial No. DE 10 2010 002 258.6, filed on Feb. 23, 2010 in Germany, the disclosures of which are incorporated herein by reference in their entirety.

BACKGROUND

The present disclosure relates to a method for determining distances and, in particular, ride heights in order to measure a chassis of a motor vehicle, and a chassis measuring device for carrying out the method according to the disclosure.

Contactless axle measurement such as is known, for example, from DE 10 2004 013 441, is based on the detection of a geometry detail of a wheel rim, the evaluation with respect to the position in space and the combination of the results to form an axle measurement.

In addition to the pure measured values, which describe the position of the wheel rims with respect to one another, the vehicle-specific predefined values, for example the structural position or an admissible range of the ride height which is predefined by the vehicle manufacturer, are necessary for an evaluation, which comprises, for example, a setpoint value/actual value comparison. The ride height is defined differently here by different vehicle manufacturers. According to one definition the ride height is defined as a difference in height between the upper edge of the wheelhouse and the upper edge of the rim. Other definitions consider, for example, the level at an element of the wheel suspension or the difference in height between the contact patch and a body feature.

Different load states of a vehicle result in different ride heights and therefore also different spring compression travel values for the same type of vehicle. Different spring compression travel values produce different results of the chassis measurement, for example, different toe—in values and camber values.

The ride height of a vehicle is conventionally measured using mechanical aids by measuring distances between fixed points on the vehicle and the contact patch, recording the measured values manually and inputting them into a computer of the chassis measuring device. Alternatively, the distances are measured with a special tool and transmitted to the computer via an interface.

This is laborious, tedious and susceptible to faults. In addition, accurate measurement is made more difficult by the fact that direct mechanical contact with the feature points to be measured is frequently impossible or can only be achieved with difficulty.

WO 2008/028832 A1 describes a method for determining distances for measuring a chassis in which firstly in each case an image of a wheel rim and an image of at least one area adjacent to the wheel rim are recorded by means of at least two measuring cameras of a measuring device. At least a first spatial point is then determined in the two recorded images of a wheel rim and the position of said first spatial point is calculated by means of triangulation. Subsequently, at least one second spatial point is determined in the two recorded images and the position of said second spatial point is calculated by triangulation. After this, the distance or the difference in height between the two spatial points is determined. The ride height of the vehicle can be determined directly or indirectly from the distance or the difference in height without the help of mechanical aids.

SUMMARY

An object of the present disclosure is to specify a method and a device for determining distances for measuring a chassis of vehicles which provide reliable results with high accuracy.

In a method according to the disclosure for determining distances in order to measure a chassis of a vehicle having a body and at least one wheel, in particular for determining a ride height, a structured light pattern is projected onto the wheel and an area of the body surrounding the wheel, a light pattern reflected by the wheel is recorded with an imaging sensor system and a 3-D cloud diagram is determined from the reflected light pattern. A parametric surface model of the wheel is adapted to the 3-D cloud diagram and the wheel normal vector is calculated for various rotational positions of the wheel. The rotational axis and the center of rotation of the wheel are determined from the spatial movement of the wheel normal vector. A point on the body of the vehicle is additionally determined by evaluating the previously determined 3-D cloud diagram. The ride height is determined as a vertical distance between the center of rotation of the wheel and the point on the body.

The disclosure also comprises a device for determining distances for measuring a chassis of a vehicle having a body and at least one wheel, in particular for determining a ride height, wherein the device comprises at least one projector which is configured to project a structured light pattern onto at least one wheel of the vehicle and an area of the body surrounding the wheel; at least one imaging sensor system which is designed to record a light pattern reflected by the wheel and an area of the body surrounding the wheel; and at least one computer. The computer is designed to determine a 3-D cloud diagram from the reflected light pattern; to adapt a parametric surface model of the wheel to the 3-D cloud diagram; to calculate wheel normal vectors for various rotational positions of the wheel; to calculate the rotational axis and therefore the center of rotation of the wheel from the spatial movement of the wheel normal vector; to determine a point on the body by evaluating the 3-D cloud diagram and to determine the ride height as a vertical distance between the center of rotation of the wheel and the point on the body.

The reliability and the accuracy of the method are improved by determining the center of rotation of the wheel and a point on the body from a 3-D cloud diagram. In particular, the positions of the points used for the measurement are determined more accurately than in conventional methods.

In one embodiment, the step of determining a point on the body by evaluating the 3-D cloud diagram includes determining the location of an edge of the body in the 3-D cloud diagram.

The disclosure also relates to a method for determining distances for measuring a chassis of a vehicle having a body and at least one wheel, in particular for determining a ride height, wherein the center of rotation of a wheel of the vehicle is determined by projecting a structured light pattern at least onto the wheel; recording a light pattern, reflected by the wheel, with an imaging sensor system; determining a 3-D cloud diagram from the reflected light pattern; adapting a parametric surface model of the wheel to the 3-D cloud diagram; calculating wheel normal vectors for various rotational positions of the wheel and calculating the rotational axis and therefore the center of rotation of the wheel from the spatial movement of the wheel normal vector. A point on the body is determined by illuminating the vehicle unstructured illumination; driving the vehicle past at least one sensor arrangement with two (stereo) or more imaging sensors; recording a number of grayscale images while the vehicle is driving past the at least one sensor arrangement and evaluating the grayscale images. The ride height is obtained as the vertical distance between the center of rotation of the wheel and the point on the body. In one embodiment, the imaging sensors provided for recording the structured light pattern can also be used to record the grayscale images.

The disclosure also relates to a device for determining distances for measuring a chassis of a vehicle having a body and at least one wheel, in particular for determining a ride height, wherein the device comprises at least one projector which is configured to project a structured light pattern onto at least one wheel of the vehicle and an area of the body surrounding the wheel; at least one imaging sensor system which is designed to record a light pattern reflected by the wheel and the area of the body surrounding the wheel; at least one arrangement of two (stereo camera) or more imaging sensors which is designed to record a number of grayscale images while the vehicle is driving past; and at least one computer. The computer is configured to determine a 3-D cloud diagram from the reflected light pattern, to adapt a parametric surface model of the wheel to the 3-D cloud diagram, to calculate the wheel normal vectors for various rotational positions of the wheel, to determine the rotational axis and therefore the center of rotation of the wheel from the spatial movement of the wheel normal vector; to determine at least one point on the body by evaluating the grayscale images; and to determine the ride height as a vertical distance between the center of rotation of the wheel and the point on the body.

Determining the center of rotation of the wheel from a 3-D cloud diagram increases the reliability and the accuracy of the method. In particular, the position of the central rotation of the wheel can be determined more accurately than in methods which are based on the evaluation of stereo images of the rim. Recording and evaluating a plurality of grayscale images permits a point on the body to be determined particularly accurately. The grayscale images can be recorded while the vehicle is driving to the measuring station, as a result of which the method is speeded up and spring compression of the chassis, such as occurs, for example, when an obstacle is being driven over and which can lead to falsification of the measurement, can be reliably detected.

In one embodiment, the determination of the ride height includes the averaging of the ride height over a plurality of stereo grayscale images. As a result, the ride height can be determined particularly precisely. Values which deviate particularly strongly from the mean value can be detected as an atypical value and excluded from the further evaluation.

In one embodiment, the evaluation of the grayscale images includes edge detection, for example with a Canny Edge filter. Such edge detection permits the grayscale images to be evaluated particularly effectively and accurately.

In one embodiment, the evaluation of the grayscale images includes stereo correspondence assignment of the edges, 3-D triangulation and classification of a wheelhouse lower edge in the 3-D contours. Such evaluation permits the grayscale images to be evaluated particularly effectively and accurately. Alternatively or additionally, a point on the body can be determined by illuminating the vehicle with unstructured illumination, driving the vehicle past at least one stereo camera, recording a number of stereo grayscale images while the vehicle is driving past the at least one stereo camera and evaluating the stereo grayscale images.

In one embodiment, the evaluation of the grayscale images includes disparity measurement by means of stereo methods. Such disparity measurement permits particularly effective and accurate evaluation of the grayscale images.

In one embodiment, the evaluation includes the generation of a 3-D cloud diagram from the disparity measurement.

In one embodiment, the method initially includes the determination of a point on the body by evaluating the 3-D cloud diagram, wherein in addition the point on the body is determined by evaluating at least two grayscale images. Combining the evaluation of the 3-D cloud diagram with the evaluation of the grayscale images in order to determine a point on the body improves the robustness of the method. In addition, the accuracy improves since faults which occur during the evaluation of the 3-D cloud diagram can be at least partially compensated by evaluating the grayscale images, and vice versa.

In one embodiment, the disclosure includes determining a point on the body at first by evaluation of the 3-D cloud diagram and evaluating at least two grayscale images in order to determine the point on the body only when the point on the body cannot be determined, or at least cannot be determined with sufficient accuracy, by evaluating the 3-D cloud diagram. This increases the robustness of the method; in particular the method can also be carried out when a point on the body cannot be determined with sufficient accuracy by evaluating the 3-D cloud diagram.

BRIEF DESCRIPTION OF THE DRAWINGS

The disclosure will be described in more detail below with reference to the appended figures:

FIG. 3a shows the 3-D cloud diagram of FIG. 2 without the points associated with the wheel;

FIG. 3b shows an enlarged detail of the 3-D cloud diagram shown in FIG. 3a;

FIG. 3c shows the 3-D cloud diagram shown in FIG. 3a with the ride height determined therefrom;

FIG. 4 is a schematic view of the division of a two-dimensional section through the 3-D cloud diagram into a plurality of segments;

FIG. 5 shows the frequency of the points in the 3-D cloud diagram as a function of the distance from the center of the wheel;

FIG. 12 is a schematic view of the execution of a ride height measurement while the vehicle is driving to the measuring location.

DETAILED DESCRIPTION

Figure 1:
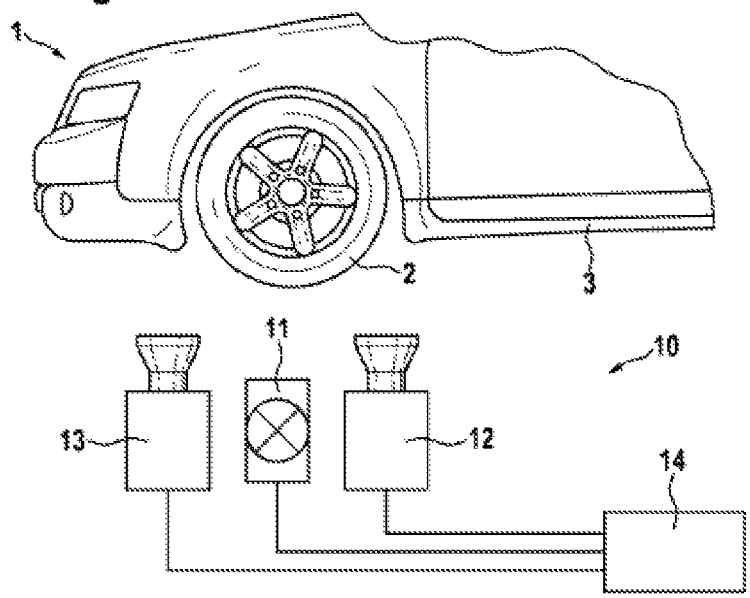
FIG. 1 is a schematic view of a measuring device according to the disclosure.

FIG. 1 shows an exemplary embodiment of a measuring device 10 according to the disclosure, past which a vehicle 1 can be moved. Apart from a wheel 2 of the vehicle 1, the body 3 of the vehicle 1, preferably in the vicinity of the wheel 2, is also included in the measurement.

The measuring device 10 has a projection device 11 for a light pattern, two calibrated imaging sensor units 12, 13 arranged in a predefined spatial position and direction with respect to the projection device 11, and a control and evaluation unit 14 which, for the purpose of transmitting data, is connected to the projection device 11 and the imaging sensor units 12, 13 which are positioned in the stereo arrangement, and has electronic devices for controlling the projection device 11, the imaging sensor units 12, 13 and components for evaluating the data output by the sensor units 12, 13 and displaying the measurement results. If grayscale images are also to be recorded, a diffuse lighting device (not shown in FIG. 1) can additionally be provided in order to improve the quality of the grayscale images.

Figure 2:
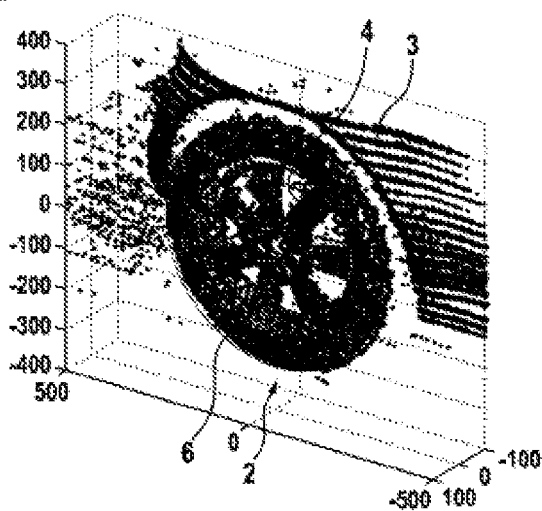
FIG. 2 shows a 3-D cloud diagram of a wheel recorded with a measuring device according to FIG. 1 and the surroundings thereof.

FIG. 2 shows by way of example a 3-D cloud diagram—recorded with a measuring device according to FIG. 1—of a wheel 2 with a rim 4 and a tire 6 surrounding the rim 4. Furthermore, the cloud diagram shown in FIG. 2 includes an area of the body 3, in particular an area of the body 3 in the vicinity of the wheel 2.

The rotational axis of the wheel 2 and, in particular, the center of rotation Z of the wheel can be determined from the 3-D cloud diagram, for example using the method described in WO 2008/046715 A1. Determining the center of rotation Z of the wheel in such a way from the 3-D cloud diagram is more robust then estimating the center using images of the rim 4 which are recorded during unstructured illumination, as is known from WO 2008/028832 A1. The determination of the center of rotation Z of the wheel from the 3-D cloud diagram can be integrated, in particular, into the measurement software for contactless measurement of axles.

FIG. 3a shows the 3-D cloud diagram from FIG. 2 without the points associated with the wheel 2. FIG. 3 therefore shows that part of the 3-D cloud diagram which represents the area of the body 3 surrounding the wheel 2 and in particular the lower edge K of a wheelhouse (wheelhouse lower edge) facing the wheel 2. FIG. 3b shows an enlarged detail of the 3-D cloud diagram in which the points which represent the wheelhouse lower edge K can be seen particularly well.

Determining the location of the wheelhouse lower edge K in the 3-D cloud diagram and determining the highest point P of the wheelhouse lower edge K (FIG. 3b) allows the ride height h to be determined easily as a vertical distance between point P and the center of rotation Z of the wheel (FIG. 3c).

The 3-D cloud diagram which has been determined from the measurements with structured illumination at one or more times is used here. For the determination of a point P on the body, in particular the wheelhouse lower edge K, after a classification step only the points from the 3-D cloud diagram which have been detected as body points are used. This detection is carried out on the basis of the geometric 3D position of the points above the surface of the tire 6.

The wheelhouse lower edge K can be directly determined given a sufficient number of 3-D points on the body surface.

In order to determine the wheelhouse lower edge K, the 3-D cloud diagram is divided up into a plurality of angular regions starting from the center of rotation Z of the wheel (FIG. 4). A wheelhouse lower edge point is derived for each angular region with the available points. For this purpose, the frequency P of the 3-D points is plotted within the angular region in the radial direction as a function of the distance r from the center Z of the wheel (FIG. 5) and, for example, the turning point at the first significant rise in the frequency profile is determined. This determined point K corresponds to a point of the wheelhouse lower edge K. In order to achieve a continuous profile of the wheelhouse lower edge K, it is recommended to define the angular regions in such a way that they overlap one another.

The ride height h can be determined reliably with a high level of accuracy by virtue of the fact that both the center of rotation Z of the wheel and the point P on the body 3 are determined by evaluating the 3-D cloud. A device for carrying out the described method can be manufactured easily and cost-effectively since the center of rotation Z of the wheel and the point P are determined from the same recording; in particular, in order to determine the point P on the body 3 there is no need for any additional illumination device for recording grayscale images during diffuse illumination.

If it is not possible to identify with sufficient accuracy a point P on the body 3 for determining the ride height using the method described above because, for example, in the vicinity of the wheel 2 the body 3 does not sufficiently reflect the light points of the structured illumination, the point P on the body 3 can also be determined by evaluating grayscale images recorded during unstructured illumination.

Figure 6:
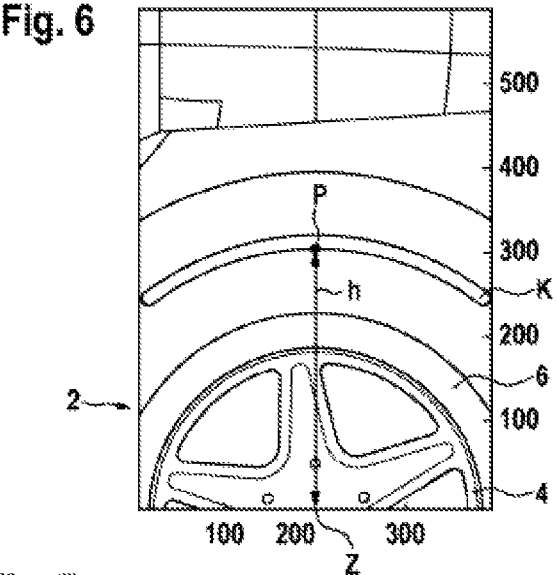
FIG. 6 is a schematic view of the determination of the ride height in a grayscale image.

FIG. 6 is a schematic view of a grayscale image of a wheel 2 with a rim 4 and a tire 6 surrounding the rim 4, as well as an area of the body 3 surrounding the wheel 2, in particular of the wheel housing which surrounds the wheel 2. The grayscale images can be recorded with the sensor units 12, 13 or alternatively with a recording device (not shown) which is specialized for recording grayscale images, such as for example a calibrated (stereo) camera.

The center of rotation Z of the wheel has, as already described, been determined previously from the 3-D cloud diagram of the wheel 2 shown in FIGS. 3a to 3c. The wheelhouse lower edge K is determined from at least two grayscale images, an example of which is shown in FIG. 6, for example by means of an edge detection method or a disparity measurement. The ride height h is then obtained as a vertical distance between the center of rotation Z of the wheel and the highest point P of the wheelhouse lower edge K.

Figure 7:
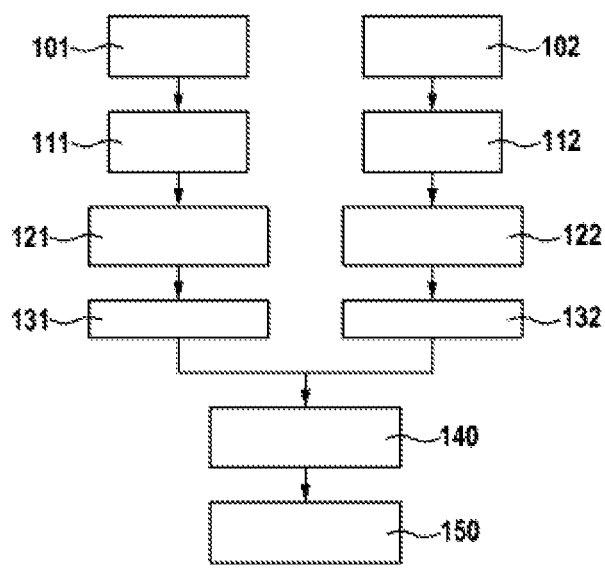
FIG. 7 is a schematic view of the sequence for determining the wheelhouse lower edge by using a stereo grayscale image pair.

FIG. 7 shows by way of example the sequence for determining the wheelhouse lower edge using a stereo grayscale image pair 101, 102 which has been recorded with two cameras or sensor arrangements 12, 13.

Figure 8A:
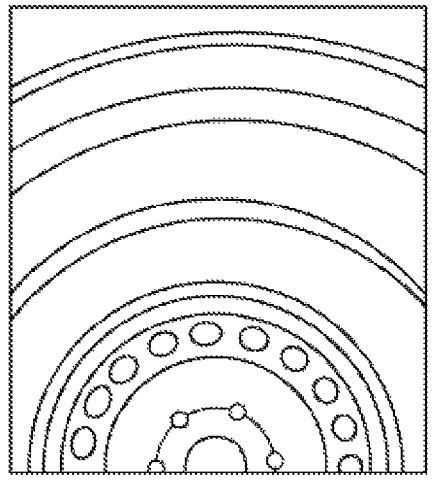
FIGS. 8a and 8b are schematic views of a pair of stereo grayscale images.
Figure 8B:
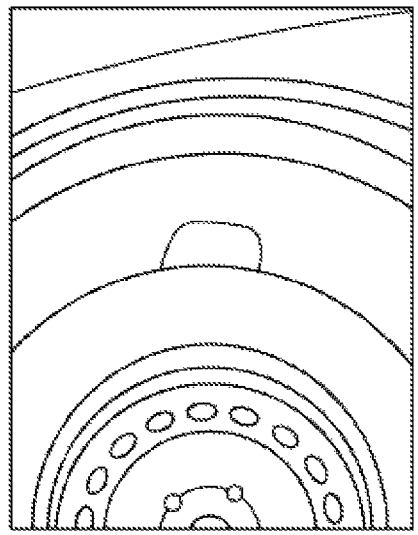

For the determination of contours, in each case an image portion starting from the center of rotation Z of the wheel in the direction of the body is considered 111, 112. FIGS. 8a and 8b each show by way of example an image portion of the two images of a stereo grayscale image pair 101, 102. The position of the center of rotation Z of the wheel and the wheel radius are known from the determination of the center of rotation Z of the wheel from the images recorded during structured illumination. The size of the detail is approximately 1.5 to 2 times the radius of the wheel 2. The contour of the wheelhouse lower edge K is expected to be outside the wheel radius in the image detail considered.

Figure 9A:
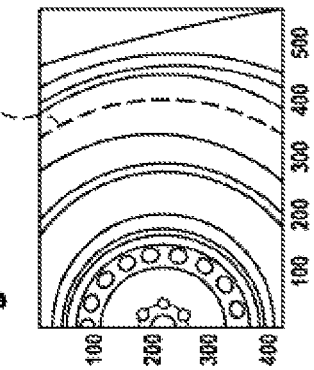
FIGS. 9a and 9b are schematic views of the Canny Edge contours in the grayscale images from FIGS. 8a and 8b.
Figure 9B:
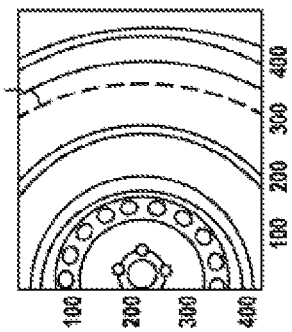

In order to determine the contour in the 3-D space, the contours are firstly detected in the respective 2-D grayscale image 101, 102 (steps 121, 122). This is done with an edge detection method, for example with the "Canny Edge" operator which is generally known from image processing. An example of this is shown in FIGS. 9a and 9b.

First, a pre-selection 131, 132 of suitable grayscale contours takes place. In this context, contours are searched for which exceed a certain length and run in the direction of the expected wheelhouse lower edge K.

Figure 10A:
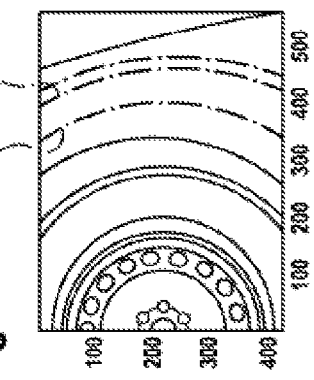
FIGS. 10a and 10b are schematic views of the contour edges determined in the grayscale images.
Figure 10B:
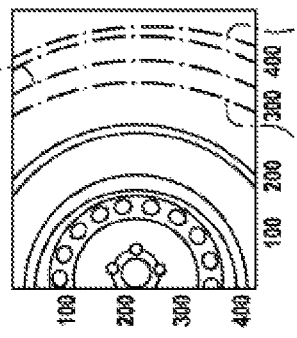

In the next step 140 (FIG. 7), the wheelhouse contour in the two individual images 101, 102 is selected. The objective is to acquire and assign from the contour edges KK (as shown in FIGS. 10a and 10b) which were previously determined in the two images, those of the wheelhouse lower edge K.

Different criteria are taken into account for the assessment. The possible assignment of a contour from the grayscale image 101 of the first sensor arrangement 12 to a contour from the grayscale image 102 of the second sensor arrangement 13 is evaluated in the form of a cost value $C_g$.

At first, the local quality is assessed by comparing contour lengths with the maximum possible contour lengths. A contour pair composed of long contours can be classified more highly than a pair with short contour lengths. It is also tested whether the detected contour has a convex curvature. The degree of contour in the grayscale image 101, 102 is tested. Furthermore, the disparity between the contour positions and also the absolute position of the contour in the grayscale images 101, 102 is assessed. The disparity must lie in a specified tolerance range. The proximity to the wheel is assessed with the absolute position of the contours. If a priori knowledge regarding the absolute position of the contour is present, this can also be included in the assessment of the contour pairs which are candidates.

The overall costs of an assignment of a contour in the grayscale image 101 to a contour in the grayscale image 102 are obtained from the sum of the individual costs $c_i$ rated with weighting factors $w_i$.

$$C_g = \sum_{i=1}^{n} w_i c_i$$

The contour pair with the lowest costs ($C_g^{min}$) corresponds to the consistent contour pair and is selected as a contour of the wheelhouse lower edge K.

Figure 11A:
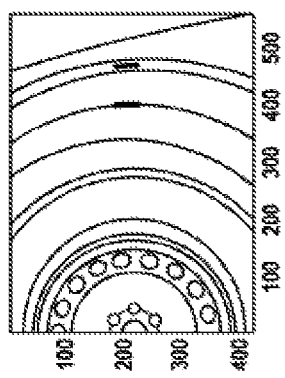
FIGS. 11a and 11b are schematic views of the wheelhouse lower edge selected from the contour edges shown in FIGS. 10a and 10b.
Figure 11B:
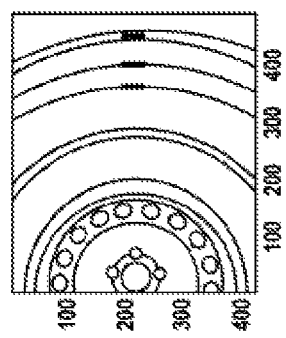

Using calibration data of the sensor units 12, 13, in step 150 (FIG. 7) the corresponding contour points K (see FIGS. 11a and 11b) are transferred to the 3-D space. If the position and shape of the wheelhouse lower edge K is known in the 3-D space, the apex point P can be determined as the local 3-D maximum with the known methods.

The evaluation of the grayscale images 101, 102 constitutes a variant of the method according to the disclosure, which variant proves advantageous in particular in unfavorable illumination situations and/or in the case of a poorly reflecting body 3.

In a further exemplary embodiment, the determination of the point P from the grayscale images 101, 102 is combined with the determination from the 3-D cloud diagram and in this way the robustness and/or accuracy of the method is improved even further.

FIGS. 12a to 12d are a schematic view of the execution of a ride height measurement during the calibration process, i.e. while the vehicle 1 is being driven to the measuring location, which is embodied for example as a lifting platform with rotational panels 9.

FIGS. 12a to 12d show schematically a track rail 8 which runs in the horizontal direction and on which a rotational panel 9 is let in in the region illustrated on the left, between edges 7 and 15. In the schematic illustration in FIGS. 12a to 12d, only a wheel 2 and a wheelhouse lower edge K of the vehicle 1 to be measured are shown.

FIGS. 12a to 12d show in a chronological sequence how the vehicle 1 (not shown) and the wheel 2 is rolled from right to left with the track rail 8 and the edge 15 is rolled onto the rotational panel 9 and, if appropriate, over the edge 7. In practice, the edges 7, 15 are often more or less clearly defined vertical steps.

During the movement of the vehicle 1 or of the wheel 2 along the track rail 8, the wheel 2 is illuminated with structured and/or unstructured illumination and at least two reflection images are recorded at various times, from which reflection images the center Z of the wheel and the wheelhouse lower edge K are determined according to one of the previously described methods, and the ride height $h_i$, i.e. the vertical distance between the center of rotation Z of the wheel and the highest point P of the wheelhouse lower edge K are determined at various times t.

In an exemplary embodiment, the recording frequency of the image series is at least 3 Hz here, with the result that given a recording time of 3 to 4 seconds, 9 to 12 (stereo) images are available for the evaluation.

In the case of a planar track rail 8, the determined wheel centers Z generally lie on a straight line during the movement or can be approximated to a straight line. In this case, the ride heights $h_t$ (t=1, 2, 3) which are determined at various times t are largely the same. When driving over an obstacle such as, for example, the vertical step 15 such as is embodied in the track rail 8 before the rotational panel 9, and the resulting spring compression of the chassis occurs, the position of the center of rotation Z of the wheel relative to the wheelhouse lower edge K changes and therefore also the ride height $h_4$ measured at this time (FIG. 12d) changes. Such a ride height value $h_4$ which is determined during the spring compression and which deviates significantly from the previously determined ride height values $h_1$ to $h_3$ can be rejected as invalid in order to prevent the result of the measurement being falsified.

If the ride height measurement is carried out during the calibration process, i.e. while the vehicle is rolling on the measuring station, the ride height h can already be determined before the actual measuring process in order to measure the chassis, which is carried out after the wheel 2 has been positioned on the rotational panel 9, with the result that in total less time is required for the entire measuring process.

The ride heights $h_t$ which are determined at various times t and at which the wheel centers Z are at least approximately on a straight line, can be evaluated statistically; in particular, the accuracy of the resulting ride height h can be improved by forming mean values of the individual ride height values $h_t$ over a plurality of images.

Ride height values $h_t$ which have been determined during the spring compression, for example when driving over an obstacle or an edge 7, 15 and which would falsify the result, can be rejected and extracted from the formation of mean values.

The ride height which is determined during driving past can be stored and used for further diagnosis during subsequent measurements when the vehicle 1 is stationary. This may be helpful in detecting faulty measuring states, for example if a person is sitting in the vehicle 1 during the execution of the measurement.

The invention claimed is:
1. A method for determining distances for measuring a chassis of a vehicle having a body and at least one wheel comprising:
projecting a structured light pattern at least onto the wheel;
recording a light pattern reflected by the wheel with an imaging sensor system;

determining a 3-D cloud diagram from the reflected light pattern;

determining a center of rotation of the wheel by:
- adapting a parametric surface model of the wheel to the 3-D cloud diagram for various rotational positions of the wheel;
- calculating the wheel normal vector for the respective rotational position of the wheel; and
- calculating the rotational axis and therefore the center of rotation of the wheel from the spatial movement of the wheel normal vector;

determining a point on the body by:
- illuminating the vehicle with unstructured illumination;
- driving the illuminated vehicle past an arrangement with at least two imaging sensors;
- recording a number of grayscale images while the vehicle is driving past the imaging sensors;
- determining the point on a lower edge of a wheelhouse in the body by evaluating the grayscale images, the evaluation of the grayscale images further comprising:
  - performing edge detection to identify a plurality of edges in the 3-D contours;
  - performing stereo correspondence assignment of the plurality of edges; and
  - performing 3-D triangulation and classification of the lower edge of the wheelhouse with reference to the stereo correspondence assignment of the plurality of edges; and
- determining a ride height as a vertical distance between the center of rotation of the wheel and the point on the lower edge of the wheelhouse in the body.

2. The method of claim 1, wherein the determination of the ride height includes averaging a number of ride heights which have been determined from a plurality of grayscale images.

3. The method of claim 1, wherein the evaluation of the grayscale images includes disparity measurement by use of stereo methods, the generation of a 3-D cloud diagram from the disparity measurement and classification of the wheelhouse lower edge.

4. The method of claim 1, wherein the edge detection is performed with a Canny Edge filter.

5. A device for determining distances for measuring a chassis of a vehicle having a body and at least one wheel, comprising:
- at least one projector configured to project a structured light pattern onto at least one wheel of the vehicle and an area of the body surrounding the wheel;
- at least one imaging sensor system configured to record a light pattern reflected by the wheel and the area of the body surrounding the wheel;
- at least one image recording device configured to record a number of grayscale images while the vehicle is driving past the image recording device; and
- at least one evaluation unit configured to:
  - determine a 3-D cloud diagram from the reflected light pattern;
  - adapt a parametric surface model of the wheel to the 3-D cloud diagram;
  - determine the respective wheel normal vector for various rotational positions of the wheel;
  - calculate the rotational axis and therefore the center of rotation of the wheel from the spatial movement of the wheel normal vector;
  - determine a point on a wheelhouse in the body by evaluating the gray scale images, the evaluation unit being further configured to:
    - perform edge detection to identify a plurality of edges in the 3-D contours;
    - perform stereo correspondence assignment of the plurality of edges; and
    - perform 3-D triangulation and classification of the lower edge of the wheelhouse with reference to the stereo correspondence assignment of the plurality of edges; and
  - determine the ride height as a vertical distance between the center of rotation of the wheel and the point on the wheelhouse in the body.

6. The system of claim 5, wherein the evaluation of the grayscale images includes disparity measurement by use of stereo methods, the generation of a 3-D cloud diagram from the disparity measurement and classification of the wheelhouse lower edge.

7. The system of claim 5, wherein the edge detection is performed with a Canny Edge filter.

\* \* \* \* \*